UNITED STATES PATENT OFFICE.

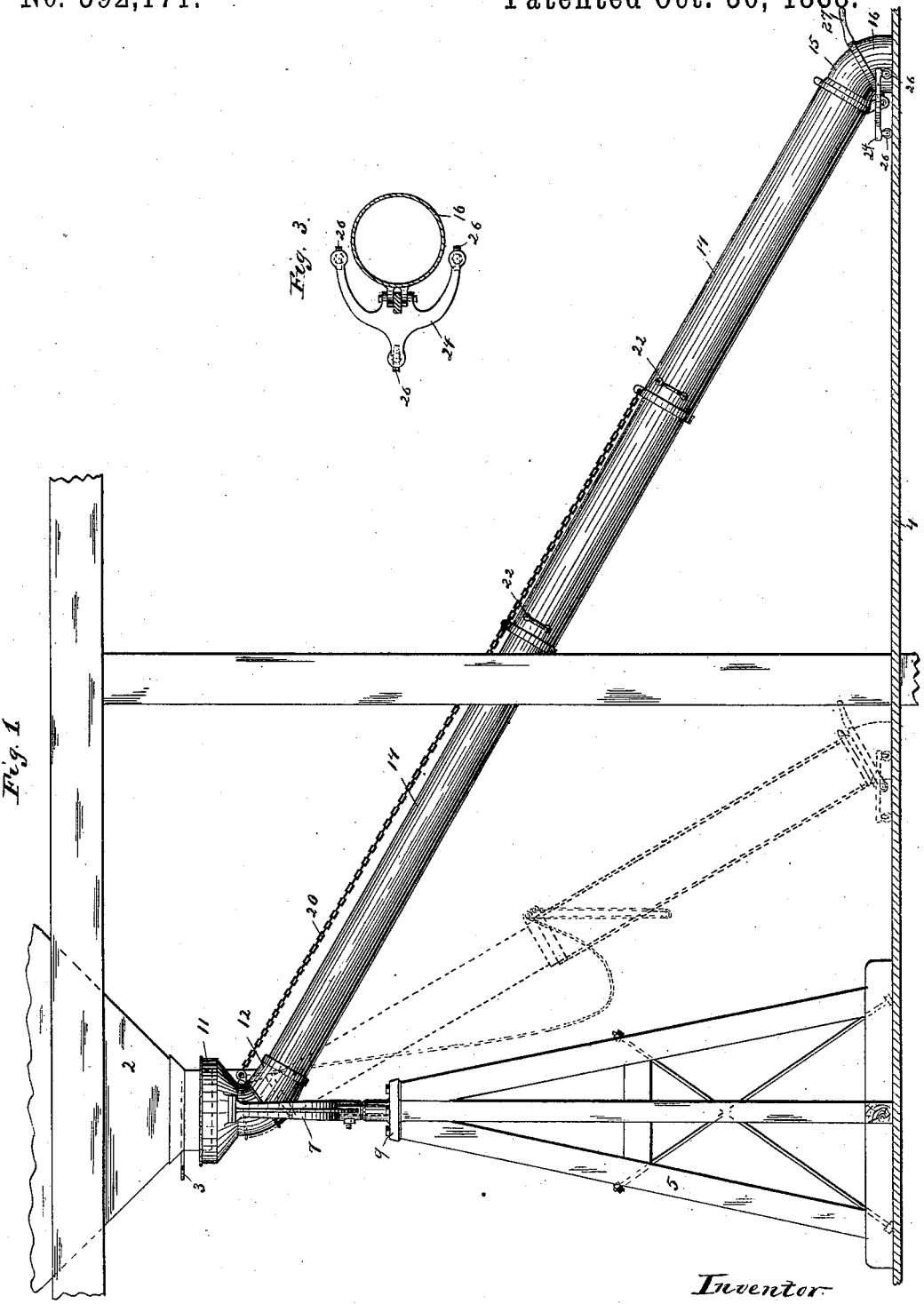

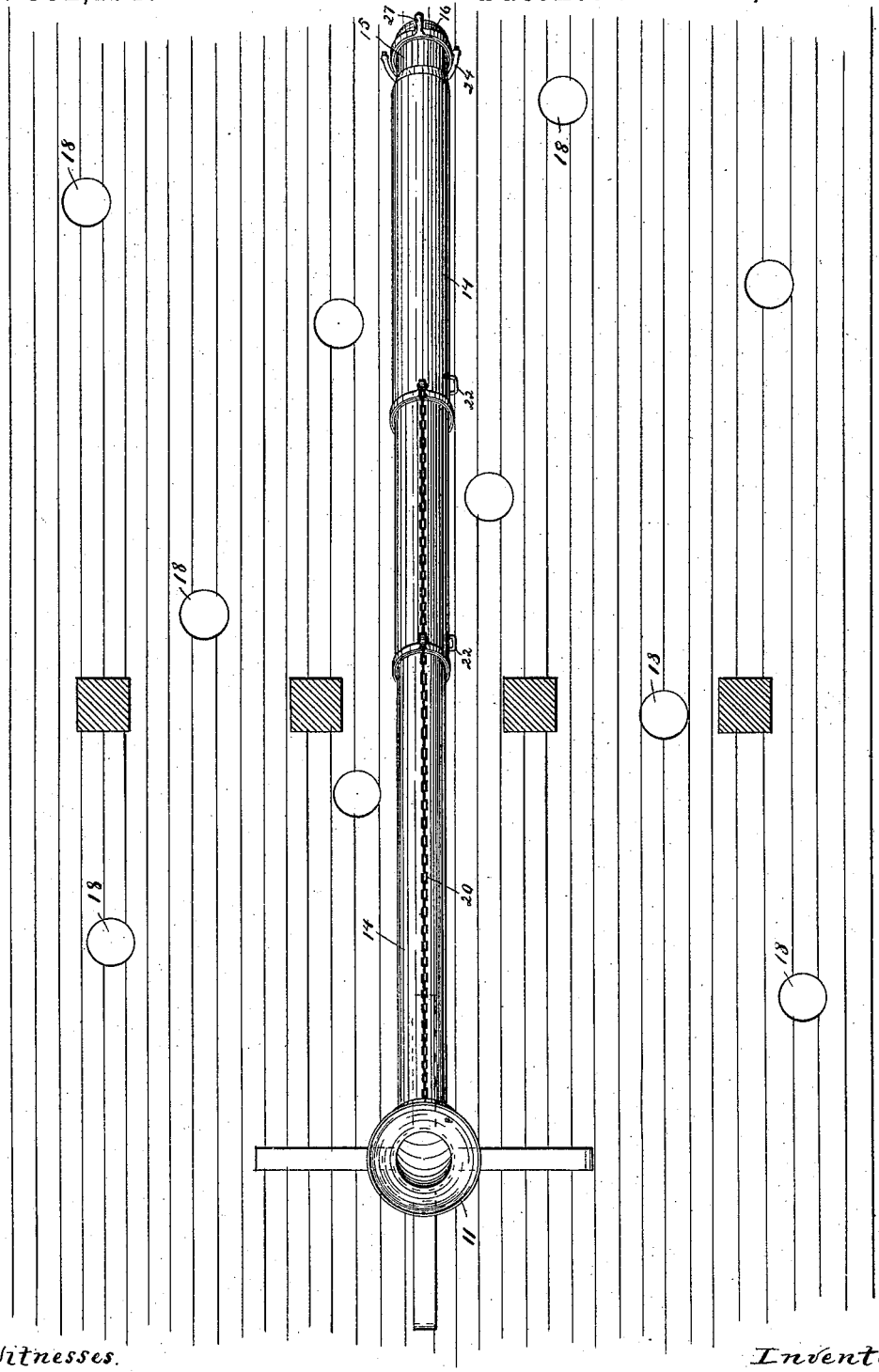

JESSE H. TROMANHAUSER, OF MINNEAPOLIS, MINNESOTA, ASSIGNOR OF TWO-THIRDS TO BARNETT & RECORD, OF SAME PLACE.

GRAIN-DISTRIBUTER.

SPECIFICATION forming part of Letters Patent No. 392,171, dated October 30, 1888.

Application filed July 5, 1888. Serial No. 279,035. (No model.)

*To all whom it may concern:*

Be it known that I, JESSE H. TROMANHAUSER, of Minneapolis, county of Hennepin, and State of Minnesota, have invented certain new and useful Improvements in Grain-Distributers, of which the following is a specification.

My invention relates to a device for carrying or distributing grain from a centrally-located hopper or inlet and delivering it to the bins through suitable openings located at any desired point on the floor of the elevator.

The invention consists, generally, in the construction and arrangement hereinafter described, and particularly pointed out in the claims.

In the drawings which form a part of this specification, Figure 1 is a side elevation of my improved distributing-spout. Fig. 2 is a plan view of the spout and a portion of the elevator-floor, showing the openings for the bins.

In the drawings, 2 represents the lower portion or hopper of a grain-weighing machine, which is supported and arranged in any ordinary manner. The end of this hopper is preferably provided with a slide, 3, which regulates the flow of material from the hopper.

4 represents the floor of the elevator, which is of ordinary construction, and preferably located over the bins in which the grain is stored.

5 represents a supporting-frame for the end of my improved spout. It may be made of any suitable size or construction to allow for the necessary variations required in the said spout.

A yoke, 7, is provided with a suitable spindle, which is supported in a suitable step-casting, 9, on the frame 5, in which it revolves. The upper extremity of this yoke is preferably secured to the funnel 11 at the upper end of the spout. This funnel covers the opening in the end of the hopper 2, although it is not brought in contact with the said hopper, and is so arranged as to receive the grain passing out of the said hopper when the slide 3 is open. The yoke 7 and its spindle form a central pivot around which the funnel 11 and the spout are free to revolve. The lower portion of this funnel 11 is provided with an outlet-opening which forms a portion of an elbow.

A hood, 12, forms a continuation of this elbow and is pivoted at one side to the funnel 11, and is arranged to close over the portion of the elbow attached to the funnel, making the said elbow extensible and allowing it to accommodate itself to any vertical angle desired.

14 represents a tube or pipe forming the spout, preferably made circular in cross-section and in two or more sections. These sections are preferably made to fit one inside the other in the form of a telescope, so that the said pipes may be lengthened or shortened at will. The lower end of the pipe 14 is preferably provided with a partial elbow, 15, and is provided with a hood, 16, hinged or pivoted to the said elbow in a manner similar to that already described for the hood 12.

The hood 16 may be provided with a beveled or cone-shaped end which fits into the opening 18, leading through the floor to the bin.

A chain, 20, may be secured to the funnel 11 and to each of the sections forming the pipe 14. This chain is for the purpose of limiting the length to which the spout may be extended and prevent the sections from becoming separated.

The openings 18 may be placed in the floor at any convenient point without the necessity of locating them on some given radius with the center of the revolving funnel. The scale-hopper may be placed in any convenient location and the funnel and distributing-spout may be supported directly beneath the said scale-hopper without the necessity of the extra spouting necessary to convey the grain from the scale-hopper to the distributing-spout when the said spout is located and revolves about the supporting beam or post. In the location of the openings 18 for the bins I also save a large amount of spouting, as I am enabled to place these openings in the most advantageous position without reference to where the distributing-spout will come.

The yoke 7 is so constructed as to allow the pipe or tube 14 to be changed from the angles shown in full lines in Fig. 1 to the position shown in dotted lines in the same figure without coming in contact with the said pipe. As the angle in the pipe is changed, the sections composing it are telescoped together and the pipe is thus shortened. The hood 12, secured to the upper end of the pipe, travels over the projecting end of the funnel 11, thus making the desired bend in the pipe and preserving the full area of the inlet-opening. The hood 16 at the opposite end of the pipe pivoted to the elbow 15 conforms to the line of the floor as the angle of the pipe is changed and completes the necessary turn at this end of the pipe and makes a tight joint with the opening in the floor, at whatever angle or position the pipe may be placed. If the posts of the mill interfere with swinging the pipe from one opening to another, the sections can be easily telescoped together until the end of the pipe is clear of the intervening obstruction, when the said end can again be drawn out and placed over the desired opening.

For convenience in sliding one section of the pipe over the other, I prefer to place one or more handles, 22, upon each of the sliding sections of the spout 14. In order to sustain the weight of the pipe and enable me to move it back and forth upon the floor with greater ease, I prefer to provide a truck, 24, to support the lower end of the said pipe. This truck may be attached to the spout at the hinge-joint of the elbow 15.

A suitable frame is constructed which receives the casters 26. I prefer to place one caster centrally underneath the pipe and one at each side, in order to distribute the weight equally upon the truck. These casters bear upon the floor of the elevator and by attaching the frame to the pivot, as described, they do not interfere with the spout or elbow when any change occurs in the angle of the said elbow as the truck is operated.

A handle, 27, may be provided upon the hood 16, by which the said hood may be raised or swung about its pivot in order to raise the projecting end of the said hood out of the opening 18 and free it from the floor before moving the spout.

What I claim as my invention is—

1. In a device of the class described, the combination, with a suitable hopper, of a revoluble spout for receiving and distributing the grain from the said hopper, provided with sections telescoping together, and an elbow, 15, connected to said spout, and a hood, 16, hinged or pivoted to said elbow, whereby the angle of the said spout may be changed without interfering with its interior opening or capacity, substantially as described.

2. In a device of the class described, the combination, with the spout, the angle of which is arranged to be changed, of an elbow, 15, secured to the end of said spout, and a hood, 16, hinged or pivoted to the said elbow, in order to allow the end of the pipe to conform to a fixed angle while the angle of the spout is changed, substantially as described.

3. In a device of the class described, the combination, with the funnel 11, of the yoke 7, secured to said funnel and adapted to revolve in a suitable support, and the pipe 14, formed of two or more sections telescoping together and secured to said funnel and adapted to revolve therewith, substantially as described.

4. In a device of the class described, the combination, with the funnel 11, of the yoke 7, secured to said funnel and adapted to revolve in a suitable support, the tube 14, pivoted to said funnel 11 and constructed of two or more sections telescoping together, and the elbow 15 and the hood 16 secured to the extremity of the lower section, in the manner and for the purpose substantially as described.

5. In a device of the class described, the combination, with the funnel 11, held in a suitable support, of the distributing-spout 14, formed of two or more sections telescoping together, the adjustable elbow 12, securing the upper extremity of the pipe 14 with the funnel 11, the hood 16 adjustably secured to the opposite end of the pipe, and the chain 20 for limiting the length to which the pipe may be adjusted, substantially as described.

6. In a device of the class described, the combination, with the funnel 11, of a suitable yoke, 7, secured to said funnel and adapted to revolve upon a suitable support, the pipe 14, formed of two or more sections telescoping together and secured to said funnel, a suitable truck, 24, supporting the lower end of said pipe and adapted to bear upon the floor of the elevator, substantially as described.

In testimony whereof I have hereunto set my hand this 15th day of June, 1888.

JESSE H. TROMANHAUSER.

In presence of—
R. H. SANFORD,
C. L. NACHTRIEB.